(12) United States Patent
Hazle et al.

(10) Patent No.: US 9,778,399 B2
(45) Date of Patent: Oct. 3, 2017

(54) COMPOSITION FOR TRANSPARENT ANTISTATIC COATING

(71) Applicant: ESSILOR INTERNATIONAL (COMPAGNIE GENERALE D'OPTIQUE), Charenton-le-Pont (FR)

(72) Inventors: Joshua Hazle, Largo, FL (US); Ronald Harmon, Clearwater, FL (US); Hoa T. Dang, Tampa, FL (US)

(73) Assignee: ESSILOR INTERNATIONAL (COMPAGNIE GENERALE D'OPTIQUE), Charenton-le-Pont (FR)

( * ) Notice: Subject to any disclaimer, the term of this patent is extended or adjusted under 35 U.S.C. 154(b) by 80 days.

(21) Appl. No.: 14/760,913

(22) PCT Filed: Jan. 14, 2013

(86) PCT No.: PCT/US2013/021445
§ 371 (c)(1),
(2) Date: Jul. 14, 2015

(87) PCT Pub. No.: WO2014/109770
PCT Pub. Date: Jul. 17, 2014

(65) Prior Publication Data
US 2015/0355387 A1  Dec. 10, 2015

(51) Int. Cl.
| | | |
|---|---|---|
| *G02B 1/16* | (2015.01) | |
| *C09D 5/00* | (2006.01) | |
| *C09D 183/00* | (2006.01) | |
| *C09D 7/12* | (2006.01) | |
| *G02C 7/02* | (2006.01) | |
| *C09D 183/06* | (2006.01) | |
| *C09D 183/08* | (2006.01) | |
| *C08K 5/43* | (2006.01) | |
| *G02B 1/10* | (2015.01) | |
| *G02B 27/00* | (2006.01) | |
| *G02B 1/04* | (2006.01) | |
| *C08K 3/36* | (2006.01) | |
| *C08K 5/00* | (2006.01) | |
| *C08K 5/42* | (2006.01) | |

(52) U.S. Cl.
CPC .......... *G02B 1/16* (2015.01); *C08K 5/43* (2013.01); *C09D 5/00* (2013.01); *C09D 7/1216* (2013.01); *C09D 183/00* (2013.01); *C09D 183/06* (2013.01); *C09D 183/08* (2013.01); *G02B 1/04* (2013.01); *G02B 1/105* (2013.01); *G02B 27/0006* (2013.01); *G02C 7/02* (2013.01); *C08K 3/36* (2013.01); *C08K 5/0075* (2013.01); *C08K 5/42* (2013.01)

(58) Field of Classification Search
CPC . G02B 1/04; G02B 1/16; G02B 1/105; G02B 27/0006; C09D 7/1216; C09D 183/00; C09D 183/06; C09D 183/08; C09D 5/00; G02C 7/02; C08K 5/42; C08K 5/43; C08K 5/0075; C08K 3/36
See application file for complete search history.

(56) References Cited

U.S. PATENT DOCUMENTS

| | | |
|---|---|---|
| 4,211,823 A | 7/1980 | Suzuki et al. |
| 4,294,950 A | 10/1981 | Kato |
| 5,015,523 A | 5/1991 | Kawashima et al. |
| 5,385,955 A | 1/1995 | Tarshiani et al. |
| 6,358,601 B1 * | 3/2002 | Bilkadi ............ C04B 35/62222 428/323 |
| 6,624,237 B2 | 9/2003 | Biteau et al. |
| 2003/0165698 A1 | 9/2003 | Vaneeckhoutte et al. |
| 2011/0207852 A1 | 8/2011 | Lin |
| 2011/0248223 A1 * | 10/2011 | Zheng .................. C09D 5/24 252/519.21 |

FOREIGN PATENT DOCUMENTS

| | | |
|---|---|---|
| EP | 0614957 | 9/1994 |
| EP | 2354206 | 8/2011 |
| JP | H06299090 | 10/1994 |
| JP | 2006070120 | 3/2006 |
| JP | 2008184556 | 8/2008 |

* cited by examiner

*Primary Examiner* — Robert Jones, Jr.
(74) *Attorney, Agent, or Firm* — Norton Rose Fulbright US LLP

(57) ABSTRACT

The present invention relates to a curable composition providing upon curing a transparent antistatic coating comprising a silica organosol, a salt comprising an alkali cation and a Bronsted acid. The invention further relates to optical articles comprising a substrate at least partially coated with a transparent antistatic coating formed by depositing onto substrate and curing the above curable composition. The obtained optical articles exhibit enhanced antistatic properties, high optical transparency, low haze and good mechanical properties, in particular a good abrasion resistance.

19 Claims, No Drawings

COMPOSITION FOR TRANSPARENT ANTISTATIC COATING

CROSS-REFERENCE TO RELATED APPLICATIONS

This application is a nation phase application under 35 U.S.C. §371 of International Application No. PCT/US2013/021445 filed 14 Jan. 2013, the entire contents of which is Specifically incorporated herein by reference without disclaimer.

BACKGROUND

Technical Field

The present invention relates to curable compositions for preparing transparent antistatic hard coatings, articles exhibiting at the same time good antistatic properties and good abrasion properties coated therewith, in particular optical and ophthalmic lenses for eyeglasses, and a process to prepare such articles. These inventions are based on the use of additives to increase antistatic properties without lowering abrasion and scratch-resistance properties.

Description of Related Art

It is well known that optical articles, which are essentially composed of insulating materials, have a tendency to get charged with static electricity. The charges which are present at the surface of said optical articles create an electrostatic field capable of attracting and fixing light objects moving near said charged surface, generally small size particles such as dusts.

In order to decrease or suppress attraction of the particles, it is necessary to decrease the intensity of the electrostatic field, i.e. to decrease the number of static charges which are present at the surface of the article. This may be carried out by imparting mobility to the charges, for instance by introducing in the optical article a layer of a material inducing a high mobility of the charges. Said layer is called antistatic layer.

By "antistatic", it is meant the property of not retaining and/or developing an appreciable electrostatic charge. An article is generally considered to have acceptable antistatic properties when it does not attract or fix dust or small particles after one of its surfaces has been rubbed with an appropriate cloth. It is capable of quickly dissipating accumulated electrostatic charges.

The ability of an optical article to evacuate a static charge can be quantified by measuring the time required for said charge to be dissipated (charge decay time). Thus, antistatic optical articles have a discharge time in the order of 100-200 milliseconds, while static optical articles have a discharge time in the order of several tens seconds, sometimes even several minutes. A static optical article having just been rubbed can thus attract surrounding dusts as long as it requires time to get discharged.

Numerous materials are well known to confer antistatic properties, but few present the transparency required for optical applications, i.e. transmittance of visible light higher than 90%.

Transparent antistatic coatings may be obtained by vapor deposition of metals or metal-oxides like indium tin oxide or vanadium oxide under. But these coatings are fragile and do not resist harsh mechanical conditions like bending or thermal stress.

Coatings applied by wet route, i.e. by applying a flowable composition to be cured have also been investigated. Antistatic properties in such coatings are generally obtained by incorporation of specific additives into an aqueous based composition, for instance a hard coating composition.

Conductive polymers represent the most used additives in wet coatings. These polymers can build a percolating network allowing for charge dissipation. Poly(3,4-ethylenedioxythiophene) (PEDOT) is especially interesting as it is transparent. Initially used in organic resins and films, this polymer has been modified to be added in aqueous compositions, which are desirable for environmental and health reasons. For instance, PEDOT is commonly grafted with Poly Styrene Sulfonate (PSS), allowing for good dispersion in water. To further enhance conductivity, various additives may be used like sulfonate surfactant (US 2011/248223). However, formulation of high molecular weight polymers in Sol-Gel coatings is difficult, as they may aggregate and have negative effect on transparency.

Another method to bring electrical conductivity in aqueous based compositions consists in adding as specific additives very light charge holders like positively charged lithium cations.

Further improvements have been proposed by addition of ionic liquids (JP2008/184556).

However, the addition of such specific additives into aqueous based compositions, and more particularly hard coating compositions is always detrimental to the abrasion properties of coating obtained upon curing of such modified compositions.

Finally, there is still a need to improve antistatic properties of hard coatings for optical articles, without lowering on one hand transparency and, on the other hand, mechanical properties such as abrasion resistance, scratch resistance, mar resistance, etc.

SUMMARY OF THE INVENTION

A first object of the invention is to provide compositions for optical application satisfying to three performance criteria in transparency, mechanical performance, and antistatic property.

Inventors have found that these well balanced performances can be obtained by incorporating two synergic compounds in a precursor composition for a hard coat.

The invention relates to a curable composition providing, upon curing, a transparent, antistatic coating, said curable composition comprising:
at least one binder comprising at least one silane of formula (I)

wherein n=2 or 3, p=1 or 2, q=0 or 1 and n+p+q=4

X, identical or different, is a hydrogen atom, alkoxy group, halogen atom, siloxy group or silazane group;

$R_1$, identical or different, is a C1-C10 linear or branched alkyl group wherein:
  the alkyl group is substituted with a monocyclic or bicyclic heterocycle at a carbon atom, the heterocycle having a hetero atom selected from oxygen or sulphur,
  a carbon atom of the alkyl group may be replaced by an oxygen atom;
  the alkyl group may be further substituted with an organic functional group;

$R_2$, identical or different, is a C1-C10 linear or branched divalent alkylene group linked to the silicon atom and $R_1$, in which a carbon atom of $R_2$ may be replaced by an oxygen atom; and $R_3$ represent an alkyl group, an alkenyl group or an aryl group;

a salt (II) comprising an alkali cation and a counter ion which is the conjugate base of a superacid $$\text{Alkali}^+\text{Superacid}^- \quad (II);$$

and a Brønsted acid of molecular weight greater than or equal to 200 g/mol.

A second object of the invention is an optical article comprising a substrate wherein the substrate is at least partially coated with a transparent antistatic coating formed by depositing onto the substrate and curing the above described curable composition. A third object of the invention is to provide a process to apply said coating composition on a substrate, and curing said coating.

DETAILED DESCRIPTION OF THE INVENTION AND PREFERRED EMBODIMENTS

The curable composition according to the invention comprises at least one binder, at least one alkali salt, and at least one Brønsted acid.

The binder according to the invention is a silicon-containing or silan compound that yields a hard coating composition, generally named "Sol-Gel" coating composition by those skilled in the art.

These silicon-containing coatings or "Sol-Gel" coatings rely on reaction of hydrolysis and condensation of various silane derivatives.

The binder is defined as a film-forming material, which is capable of improving adhesion of the antistatic coating to the underlying layer and/or upper layer and/or the integrity of the antistatic coating.

The binder generally allows strengthening abrasion and/or scratch resistance of the final optical article, depending on the binder nature.

The binder according to the invention comprises at least one silane of formula (I)

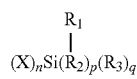
(I)

wherein n=2 or 3, p=1 or 2, q=0 or 1 and n+p+q=4;

X, identical or different, is without limitation:
hydrogen H,
an alkoxy group O-Akl, wherein Akl represents a linear or branched C1-C10 alkyl group, preferably a C1-C4 alkyl group,
a halogen atom, preferably Cl or Br,
a siloxy group, preferably trialkylsiloxy groups with linear or branched C1-C10 alkyl substituents, more preferably trimethylsiloxy group.
a silazane group linked to the silicon atom through a Si—N bond, preferably, a silazane group substituted with C1-C4 alkyl chains, more preferably, the silazane group being —NHSiMe3.

The X groups are preferably alkoxy groups, in particular methoxy, ethoxy, propoxy or butoxy, more preferably methoxy or ethoxy. In this case, compounds of formula (I) are alkoxysilanes.

$R_1$, identical or different, is a C1-C10 linear or branched alkyl group wherein:
the alkyl group is substituted with a monocyclic or bicyclic heterocycle at a carbon atom, the heterocycle having a hetero atom selected from oxygen or sulphur,
a carbon atom of the alkyl group may be replaced by an oxygen atom;
the alkyl group may be further substituted with an organic functional group; and
$R_1$ is linked to $R_2$ by a C—C, ether or thioether bond.

According to this definition of $R_1$, the heterocycle includes an oxygen (resp. sulphur) atom directly attached to two adjacent or non-adjacent carbon atoms of a carbon chain (e.g., providing a monocylic ring) or ring system (e.g., providing a bicyclic ring). Such structures are usually known as epoxy (resp. thioepoxy) compounds. A special class of epoxy compounds are epoxides (resp. thioepoxides), wherein an oxygen (resp. sulphur) atom is directly attached to two adjacent carbon atoms.

$R_2$, identical or different, is a C1-C10 linear or branched divalent alkylene group linked to the silicon atom and $R_1$, in which a carbon atom of $R_2$ may be replaced by an oxygen atom.

$R_3$ is linked to the silicon atom through a Si—C bond. $R_3$ may be, without limitation,
a linear or branched C1-C10 alkyl group in which a carbon atom may be further substituted with an organic functional group selected from amino, hydroxyl or thio functions, preferably C1-C4 alkyl groups, more preferably methyl or ethyl,
a C1-C10 alkenyl group,
a monocyclic or bicyclic aryl group, preferably benzyl group, phenyl group or substituted phenyl group, more preferably a phenyl group substituted with one or more C1-C4 alkyl groups, The most preferred $R_3$ groups are alkyl groups, more preferably C1-C4 alkyl groups, and more preferably, methyl groups.

Epoxysilane of formula (I) are well suited to prepare binders.

When n=3, p=1 and q=0, epoxysilanes include but are not limited to glycidoxy methyl trimethoxysilane, glycidoxy methyl triethoxysilane, glycidoxy methyl tripropoxysilane, alpha-glycidoxy ethyl trimethoxysilane, alpha-glycidoxy ethyl triethoxysilane, beta-glycidoxy ethyl trimethoxysilane, beta-glycidoxy ethyl triethoxysilane, beta-glycidoxy ethyl tripropoxysilane, alpha-glycidoxy propyl trimethoxysilane, alpha-glycidoxy propyl triethoxysilane, alpha-glycidoxy propyl tripropoxysilane, beta-glycidoxy propyl trimethoxysilane, beta-glycidoxy propyl triethoxysilane, beta-glycidoxy propyl tripropoxysilane, gamma-glycidoxy propyl trimethoxysilane, gamma-glycidoxy propyl triethoxysilane, gamma-glycidoxy propyl tripropoxysilane, 2-(3,4-epoxycyclohexyl)ethyltrimethoxysilane, 2-(3,4-epoxycyclohexyl)ethyltriethoxysilane. Other useful epoxytrialkoxysilanes are described in U.S. Pat. Nos. 4,294,950, 4,211,823 5,015,523, 5,385,955 and EP 0614957, which are hereby incorporated by reference. Among those silanes, gamma-glycidoxypropyltrimethoxysilane (GLYMO) is preferred.

When n=2, p=1 and q=1, epoxysilanes include but are not limited to, epoxydialkoxysilanes such as gamma-glycidoxypropyl-methyl-dimethoxysilane, gamma-glycidoxypropyl bis(trimethylsiloxy)methylsilane, gamma-glycidoxypropylmethyl-diethoxysilane, gamma-glycidoxypropyl-methyl-diisopropenoxysilane, and gamma-glycidoxyethoxypropyl-methyl-dimethoxysilane. When epoxydialkoxysilanes are used, they are preferably combined with epoxytrialkoxysilanes such as those described above, and are preferably employed in lower amounts than said epoxytrialkoxysilanes. Preferred epoxydialkoxysilane is gamma-glycidoxypropyl-methyl-dimethoxysilane (MeGLYMO).

The binder may comprise additionally tetraalkoxysilane, catalyst, mineral fillers, wetting agent and solvent to yield a hard coating composition.

Tetraalkoxysilane may be added in the binder, as it is well know by one skilled in the art. Tetraethyloxysilane (TEOS), tetramethyloxysilane (TMOS), dimethyldiethoxysilane (DMDES) and mixture thereof are preferred.

Catalyst suitable for the composition is selected within metal acetylacetonate, preferably aluminum acetylacetonate.

The binder according to the invention may comprise and preferably further comprises fillers chosen among mineral oxides.

Fillers are chosen within the mineral oxide particles whose size and refractive index are suited to prepare a transparent coating, with no haze. Particles may be, without limitation, silicon oxide, zirconium oxide, titanium oxide, aluminium oxide, tin oxide, antimony oxide or mixed oxides of silicon, zirconium, titanium, aluminium, tin or antimony. Preferred particles are silicon dioxide nanoparticles (silica).

The size of these particles of is preferably in the nanometric range, lower than 500 nm, more preferably lower than 200 nm.

Such fillers are usually used as dispersion in a hydro-alcoholic solvent. MA-ST-HV silica (NISSAN Chemical, 30% wt dispersion in methanol) or silica sol obtained according to U.S. Pat. No. 6,624,237 are preferred.

Wetting agent is used to ensure that antistatic coating will cover easily the optical substrate, as it is well known by one skilled in the art.

The binder according to the invention may comprise and preferably further comprises a solvent.

Solvent is selected to adjust viscosity of composition and a good dispersion of components. Solvent is usually water or oxygenated solvent chosen in alcohol, ketone, ether families or mixtures thereof. Preferred solvents are methanol, butanol, acetone, diacetone, methylethylketone or glycol ethers such as solvent sold under the Dowanol trademark (Dow Chemical). The solvent is more preferably methylethylketone.

The above described binder form silica organosols. By a treatment in an acidic solution, advantageously in hydrochloric acid solution, silanes are hydrolyzed and form silanol groups which undergo condensation upon curing and generate interpenetrated networks, which are capable of establishing bonds with the underlying layer.

Usual binder formulations or "sol gel" coating formulation may be found in US 2003/165698.

Antistatic performance is a required property to avoid dust accumulation on optical articles. According to the invention, antistatic performance is brought by the synergic effect of two additives: a salt and a Brønsted acid.

If dispersed in water or a hydro-alcoholic solvent, salt will be partially or totally dissociated into two charged species. When anion moiety of the salt is a strong acid, dissociation is complete.

The curable composition according to the invention comprises salts of formula (II):

Alkali$^+$Superacid$^-$      (II)

Alkali$^+$ cation is selected from positively charged lithium, sodium or cesium. As electrical conductivity is linked to the mobility of charged species in the bulk material, small alkali$^+$ cations yield better results: lithium is the preferred alkali compound.

Superacid is defined as acid stronger than pure sulphuric acid. Superacids are very often fluorinated because of the very strong electro-negativity of fluorine. Fluorosulfonic acid ($FSO_3H$), trifluoromethanesulfonic acid ($CF_3SO_3H$), also known as triflic acid, Lithium bis(trifluoromethanesulfonimide), and their derivatives are suitable in their deprotonated forms as counter ions for alkali cations according to the invention. Lithium bis(trifluoromethanesulfonimide) and Lithium trifluoromethanesulfonic salts/derivatives of trifluoromethanesulfonic acid are preferred. Most preferred is Lithium bis(trifluoromethanesulfonimide) salt.

An increase in charge holders concentration is desirable to increase electrical conductivity, but leads to poor mechanical properties. Preferred concentration is determined by a balance between expected performances.

Brønsted acids ZH are species able to donate a hydrogen cation $H^+$ then becoming the conjugate Brønsted base of the acid, carrying a negative charge: $Z^-$. Brønsted acid may be added in a composition in the form of an acid ZH or in the form of a salt $M^+Z^-$ where $M^+$ is any counter ion.

Brønsted acids comprise, without limitations, sulphate, sulfonate, carboxylate, phosphate, phosphonate or phosphinate functions. If Brønsted acid is strong enough, total dissociation will occur and generate carriers of negative charges in the composition. Superacids described above are strong Brønsted acids.

Brønsted acids are usually very soluble in the binders or "sol-gel" coating compositions described above, as they carry free charges. Grafting Brønsted acids on polymers of large molecular weight is a way to promote dispensability in hard coat compositions.

The density, mobility and distribution of charge brought by Brønsted acids will also influence electrical properties. Usually, the man skilled in that art tries to increase charge density of Brønsted acids to improve electrical conductivity.

It has been found surprisingly that when Brønsted acids whose molecular weight exceeds 200 g/mol, especially Brønsted acids having a hydrophobic tail, are used with alkali salts, antistatic performance is increased.

Preferred Brønsted acids have a molecular weight in the range 200-2000 g/mol, preferably in the range 200-1000 g/mol. Very high molecular (>2000 g/mol) weight Brønsted acids may have poor solubility in binders, and are less preferred.

Brønsted acids of formula (III), known as anionic surfactants, are preferred:

$R_4$—$(R_5)_r$—ZH      (III)

wherein $R_4$ represents a linear or branched C4-C22 alkyl group;

$R_5$ represents an arylene group; and

Z represents a Brønsted acid function such as sulphate, sulfonate, carboxylate, phosphate, phosphonate or phosphinate, and r=0 or 1.

All compounds of formula (III) can be used under a salt form, such as, without limitation, a lithium salt, a potassium salt, a sodium salt, a cesium salt, a phosphonium salt, an ammonium ($NH_4^+$) salt, a substituted ammonium salt such as $NH_3^+C(CH_2OH)_3$ or a quaternary ammonium salt.

When r is 0, Brønsted acids according to formula (III) can be from vegetal or synthetic origin.

Brønsted acids from vegetal origin are preferably carboxylic acids derived from natural oils and are well know by those skilled in the surfactant area. Especially, saturated fatty acids (lauric, myristic, palmitic, stearic), unsaturated fatty acids (myristoleic, palmitoleic, oleic, erucic) or oxygenated fatty acids (ricinoleic) may be used.

Brønsted acids from synthetic origin may be functionalized with various acid functions as listed above. Suitable anionic surfactants, without limitations, include linear alpha sulfonates, alkyl sulfonates and alkyl sulfates, alkyl phosphinates, alkyl phosphonates and alkyl phosphates. $R_4$ chain can be chosen in n-alkyl (n-butyl, n-hexyl, n-octyl, n-decyl, n-dodecyl, n-tetradecyl) or branched alkyl (2-ethylhexyl, tridecanyl). The $R_4$ group of compound (III) preferably has more than 5 carbon atoms. Preferred anionic surfactant is Sodium Dodecyl Sulfate (SDS).

When r is 1, $R_5$ is preferably a phenylene group. Linear benzene sulfonates are well known anionic surfactants corresponding to formula (III) DoDecylBenzeneSulfonic acid (DDBS) is preferred.

To ensure that mechanical properties, optical properties and electric conductivity are well balanced, antistatic additives are introduced in limited amount.

Alkali salt (II) concentration is less than 5%, preferably less than 2%, more preferably less than 1%.

Brønsted acid concentration is less than 5%, preferably less than 2%, more preferably less than 1%.

All concentrations are in weight, as compared to the dry content of the antistatic composition.

Further additives may be added to the curable composition according the invention in order to impart other properties.

Thus, the curable composition according to the invention providing, upon curing, a transparent, antistatic coating, may also contain various additives conventionally used in polymerizable compositions, in conventional proportions. These additives include stabilizers such as antioxidants, UV light absorbers, light stabilizers, anti-yellowing agents, adhesion promoters, dyes, photochromic agents, pigments, rheology modifiers, lubricants, cross-linking agents, photo-initiators, fragrances, deodorants and pH regulators. They should neither decrease the effectiveness of the antistatic agent nor deteriorate optical properties of the article.

The invention also relates to an optical article comprising a substrate, wherein the substrate is at least partially coated with the transparent antistatic coating formed by depositing onto the substrate the curable composition according to the invention and curing said curable composition.

Thus, the inventive curable coating composition is coated on an optical article.

The optical article is selected from ophthalmic lens, ocular visor, and sight optical systems. Especially, ophthalmic lens can be an uncorrective (also called plano or afocal lens) or corrective ophthalmic lens. Corrective lens may be a unifocal, a bifocal, a trifocal or a progressive lens.

The optical article prepared according to the present invention comprises a transparent optical substrate, preferably a lens or lens blank, and more preferably an ophthalmic lens or lens blank. This optical substrate may be coated on its front side, or on its back side, or on both sides with the coating according to the invention.

The optical substrate may be mineral or organic. Organic optical substrates may be either thermoplastic materials such as polycarbonates, polymethylmethacrylates (PMMA), thermoplastic polyurethanes or polyamide; or thermosetting materials such as polymers or copolymers of diethylene glycol bis(allylcarbonate) (in particular CR-39 ® from PPG Industries), thermosetting polyurethanes, polythiourethanes, polyepoxides, polyepisulfides, poly(meth)acrylates, bisphenol-A (meth)acrylic derivatives, polythio(meth)acrylates, or blends thereof. Preferred materials for the lens substrate are polycarbonates (PC) and diethylene glycol bis(allylcarbonate) polymers, in particular substrates made of CR-39 ® diethylene glycol bis(allylcarbonate) polymers.

The antistatic coating is applied by well know coating techniques, like spin coating, dip coating, spray coating, brush coating or roller coating. Spin coating and dip coating are preferred. Coating is then cured. Preferred curing activation is heat.

The curable composition according to the invention provides coating with good antistatic properties.

The composition according to the invention enables the production of optical articles having high transmittance (around 92%), low haze, high electrical conductivity, excellent antistatic properties while maintaining excellent abrasion resistance.

Thickness of the antistatic coating in the final optical article preferably ranges from 5 to 5000 nm, preferably from 50 to 3000 nm.

The present invention provides optical articles having charge decay times lower than 500 ms, and preferably lower than 300 ms.

The invention further relates to a process for preparing a transparent antistatic optical article comprising:
providing an optical substrate having at least one main surface,
applying onto at least part of said main surface the composition according to the invention, and
curing said composition.

EXAMPLES

Testing Methods

The following test procedures were used to evaluate the optical articles prepared according to the present invention. Three samples for each system were prepared for measurements and the reported data were calculated from these multiple measurements over multiple days.

1) Charge Decay Time

In the present patent application, charge decay times of optical articles which have been beforehand subjected to a corona discharge at 9000 volts were measured using JCI 155v5 Charge Decay Test Unit from John Chubb Instrumentation at 25.4 deg. C. and 50% relative humidity.

The unit was set up with JCI 176 Charge Measuring Sample Support, JCI 191 Controlled Humidity Test Chamber, JCI 192 Dry Air Supply Unit and Calibration of voltage sensitivity and decay time measurement performance of JCI 155 to the methods specified in British Standard and Calibration voltage measurements and resistor and capacitor values traceable to National Standards.

Both sides of the lenses are tested.

2) Determination of the Abrasion Resistance ("ISTM Bayer Test" or "Bayer Alumina")

The Bayer abrasion test is a standard test used to determine the abrasion resistance of curved/lens surfaces. Determination of the Bayer value was performed in accordance with the standards ASTM F735-81 (Standard Test Method for Abrasion Resistance of Transparent Plastics and Coatings Using Oscillating Sand Method), except that the sand is replaced by alumina.

For this test, a coated lens and an uncoated lens (reference lens of similar curvature, diameter, thickness and diopter) were subjected to an oscillating abrasive box (using approximately 500 g of aluminum oxide ZF 152412 supplied by Specialty Ceramic Grains, former Norton Materials) for 300 cycles of abrasion in 2 minutes.

The results are expressed as a calculated ratio of the reference lens to the coated lens (Bayer value=Hstandard/Hsample). The Bayer value is a measure of the performance of the coating, with a higher value meaning a higher abrasion resistance.

3) Haze Value, Transmittance and Thickness

The haze value of the final optical article was measured by light transmission utilizing the Haze-Guard Plus haze meter from BYK-Gardner (a color difference meter) according to the method of ASTM D1003-00, which is incorporated herein in its entirety by reference. All references to "haze" values in this application are by this standard. The instrument was first calibrated according to the manufacturer's directions. Next, the sample was placed on the transmission light beam of the pre-calibrated meter and the haze value was recorded from three different specimen locations and averaged. Transmittance was measured using the same device.

Preparation of Antistatic Coated Articles:

Antistatic coatings were prepared by mixing epoxysilanes (glycidoxypropyltrimethoxysilane (GLYMO)) with or without dimethyldiethoxysilane (DMDES)), 0.1 N HCl and an SiO2 nanoparticles dispersion in methanol, catalyst (Aluminum acetyl acetonate Al(AcAc)$_3$), a wetting agent (FC-4430 fluorinated surfactant, supplied by 3M) and either 0, 1 or the 2 additives according to the invention (Lithium bis(trifluoromethanesulfonimide) as salt according to the invention and 4-dodecylbenzene sulfonic acid as Brønsted acid according to the invention)

Compositions of antistatic coatings are listed in Table 1 and 2.

TABLE 1

| Coating composition | C. A | C. 1 | C. 2 | C. 3 | C. 4 | 5 |
|---|---|---|---|---|---|---|
| Glymo | 21.8 g | 21.8 g | 21.8 g | 21.8 g | 21.8 g | 21.8 g |
| HCl 0.1N | 5 g | 5 g | 5 g | 5 g | 5 g | 5 g |
| Silica sol (20% in Methanol) | 67.2 g | 67.2 g | 67.2 g | 67.2 g | 67.2 g | 67.2 g |
| Catalyst (Al(acac)$_3$) | 1.5 g | 1.5 g | 1.5 g | 1.5 g | 1.5 g | 1.5 g |
| Wetting Agent | 0.2 g | 0.2 g | 0.2 g | 0.2 g | 0.2 g | 0.2 g |
| MethylEthylKetone | 4.2 g | 4.2 g | 4.2 g | 4.2 g | 4.2 g | 4.2 g |
| Dry content of coating | 36.9 g | 36.9 g | 36.9 g | 36.9 g | 36.9 g | 36.9 g |
| Lithium bis(trifluoromethanesulfonimide) | | 0.35 g | 0.7 g | | | 0.35 g |
| 4-dodecylbenzene sulfonic acid | | | | 0.35 g | 0.7 g | 0.35 g |

TABLE 2

| Coating composition | C. B | C. 6 | C. 7 | C. 8 | C. 9 | 10 |
|---|---|---|---|---|---|---|
| Glymo | 18.6 g | 18.6 g | 18.6 g | 18.6 g | 18.6 g | 18.6 g |
| DMDES | 9.7 g | 9.7 g | 9.7 g | 9.7 g | 9.7 g | 9.7 g |
| HCl 0.1N | 6.6 g | 6.6 g | 6.6 g | 6.6 g | 6.6 g | 6.6 g |
| MAST silica sol (30% in Methanol) | 60 g | 60 g | 60 g | 60 g | 60 g | 60 g |
| Catalyst (Al(acac)$_3$) | 1.2 g | 1.2 g | 1.2 g | 1.2 g | 1.2 g | 1.2 g |
| Wetting Agent | 0.1 g | 0.1 g | 0.1 g | 0.1 g | 0.1 g | 0.1 g |
| MethylEthylKetone | 3.6 g | 3.6 g | 3.6 g | 3.6 g | 3.6 g | 3.6 g |
| Dry content of coating | 47.6 g | 47.6 g | 47.6 g | 47.6 g | 47.6 g | 47.6 g |
| Lithium bis(trifluoromethanesulfonimide) | | 0.45 g | 0.9 g | | | 0.45 g |
| 4-dodecylbenzene sulfonic acid | | | | 0.45 g | 0.9 g | 0.45 g |

(C.: comparative)

Coatings are applied by spin coating on the front face (convex) of the lens.

Target thickness for compositions C A, C1 to C4 and 5: 1.9 μm; 900 r.p.m for 3 seconds (application)/1800 r.p.m. for 10 seconds (spin off). Quantity applied was approximately 2-3 grams per lens.

Target thickness for compositions C B, C6 to C9 and 10: 3.0 μm; 1100 r.p.m for 3 seconds (application)/2200 r.p.m. for 10 seconds (spin off). Quantity applied was approximately 2-3 grams per lens.

Optical substrates are ORMA® 6-base plano round lenses (obtained by polymerizing CR-39® diethylene glycol bis (allyl carbonate) monomer).

Coating is cured in two steps: 15 minutes at 75° C. then 180 minutes at 100° C.

Technical performances are listed in Table 3.

TABLE 3

| Composition | Decay Time (s) | Bayer | Transmittance (%) |
|---|---|---|---|
| C. A | 2.20 | 6.0 | 92.2 |
| C. 1 | 0.242 | 6.0 | 92.2 |
| C. 2 | 0.163 | 6.0 | 92.3 |
| C. 3 | 0.921 | 2.0 | 92.2 |
| C. 4 | 0.070 | 1.2 | 92.2 |
| 5 | 0.068 | 2.3 | 92.2 |
| C. B | 100 | 3.4 | 92.3 |
| C. 6 | 10.2 | 3.2 | 92.4 |
| C. 7 | 2.10 | 3.0 | 92.3 |
| C. 8 | 45.6 | 2.4 | 92.4 |
| C 9 | 0.89 | 1.4 | 92.3 |
| 10 | 0.27 | 2.3 | 92.4 |

(C.: comparative)

Coating compositions 5 and 10 demonstrate synergistic effect of salt and Brønsted acid.

Coating composition 5 and 10 according to the invention, that is to say coating compositions in which both salt and Brønsted acid are simultaneously added, yield, after curing, in coatings showing much lower decay time as compared to coatings in which none or only one additive according to the invention is added. In addition, optical transmittance is not affected, and Bayer test is degraded but within acceptable values.

In other words the simultaneous use of a salt as defined herein and a Brønsted acid leads to a coating that exhibits at the same time high antistatic properties, high transmittance, and good abrasion resistance.

The invention claimed is:

1. A curable composition providing, upon curing, a transparent antistatic coating, said curable composition comprising:
   at least one binder comprising at least one silane of formula (I)

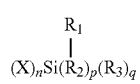

(I)

wherein n=2 or 3, p=1 or 2, q=0 or 1 and n+p+q=4
   X, identical or different, is a hydrogen atom, alkoxy group, halogen atom, siloxy group or silazane group;
   $R_1$, identical or different, is a C1-C10 linear or branched alkyl group wherein:
   the alkyl group is substituted with a monocyclic or bicyclic heterocycle at a carbon atom, the heterocycle having a hetero atom selected from oxygen or sulphur,
   a carbon atom of the alkyl group may be replaced by an oxygen atom;
   the alkyl group may be further substituted with an organic functional group;
   $R_2$, identical or different, is a C1-C10 linear or branched divalent alkylene group linked to the silicon atom and $R_1$, in which a carbon atom of $R_2$ may be replaced by an oxygen atom; and
   $R_3$ represent an alkyl group, an alkenyl group or an aryl group;
   a salt (II) comprising an alkali cation and a counter ion which is the conjugate base of a superacid $$\text{Alkali}^+ \text{Superacid}^- \quad (II);$$

and
   a Brønsted acid of molecular weight greater than or equal to 200 g/mol.

2. The curable composition of claim 1, wherein the molecular weight of Brønsted acid is lower than 2000 g/mol.

3. The curable composition of claim 2, wherein the molecular weight of Brønsted acid is lower than 1000 g/mol.

4. The curable composition of claim 1, wherein the Brønsted acid is a surfactant of formula (III)

$$R_4\text{---}(R_5)_r\text{---}ZH \quad (III)$$

wherein:
   $R_4$ represents a linear or branched alkyl group;
   $R_5$ represents an arylene group; and
   Z represents a Brønsted acid function selected from the group consisting of sulphate, sulfonate, carboxylate, phosphate, phosphonate or phosphinate;
   r=0 or 1.

5. The curable composition of claim 1, wherein the Brønsted acid represents less than 5% in weight, relative to the dry weight of the curable composition.

6. The curable composition of claim 5, wherein the Brønsted acid represents less than 1% in weight, relative to the dry weight of the curable composition.

7. The curable composition of claim 1, wherein the alkali cation of salt (II) is lithium.

8. The curable composition of claim 1, wherein the counter ion of compound (II) is bis(trifluoromethanesulfonimide) or a derivative of trifluoromethanesulfonic acid.

9. The curable composition of claim 1, wherein the compound (II) represents less than 5% in weight, relative to the dry weight of the curable composition.

10. The curable composition of claim 9, wherein the compound (II) represents less than 1% in weight, relative to the dry weight of the curable composition.

11. The curable composition of claim 1, wherein the binder further comprises fillers chosen among mineral oxides.

12. The curable composition of claim 11, wherein the fillers are silicon dioxide nanoparticles.

13. The curable composition of claim 1, wherein the binder further comprises a solvent.

14. The curable composition of claim 13, wherein the solvent is methylethylketone.

15. An optical article comprising a substrate, wherein the substrate is at least partially coated with a transparent antistatic coating formed by depositing onto the substrate and curing a curable composition of claim 1.

16. The optical article of claim 15, further defined as an ophthalmic lens.

17. The optical article of claim 15, wherein the thickness of the antistatic coating ranges from 5 to 5000 nm.

18. The optical article of claim 15, further defined as having a decay time lower than 500 ms.

19. A process for preparing a transparent antistatic optical article comprising:
   providing an optical substrate having at least one main surface;
   applying onto at least part of said main surface a composition of claim 1; and
   curing said composition.

* * * * *